United States Patent [19]

Nakayama et al.

[11] Patent Number: 5,233,597
[45] Date of Patent: Aug. 3, 1993

[54] MAGNETO-OPTICAL DISK HAVING A LAYER OF VARYING THICKNESS

[75] Inventors: Junichiro Nakayama; Hiroyuki Katayama; Kenji Ohta, all of Nara, Japan

[73] Assignee: Sharp Kabushiki Kaisha, Osaka, Japan

[21] Appl. No.: 714,933

[22] Filed: Jun. 13, 1991

[30] Foreign Application Priority Data

Jun. 13, 1990 [JP] Japan .................................. 2-158070
Jul. 20, 1990 [JP] Japan .................................. 2-193225

[51] Int. Cl.$^5$ ........................ G11B 13/04; G11B 7/00; G11B 7/24
[52] U.S. Cl. .................................. 369/275.1; 369/13; 369/280; 369/283; 430/945; 428/694
[58] Field of Search .................. 369/13, 275.1, 275.2, 369/275.3, 280, 283, 286, 275.5; 204/192.2; 430/945; 428/694

[56] References Cited

U.S. PATENT DOCUMENTS

| | | | |
|---|---|---|---|
| 4,443,294 | 4/1984 | Suenaga et al. | 156/656 |
| 4,707,431 | 11/1987 | Umehara | 369/275.1 X |
| 4,729,938 | 3/1988 | Tajima et al. | 369/275.1 X |
| 4,737,877 | 4/1988 | Krongelb et al. | 369/275.1 X |
| 4,861,699 | 8/1989 | Wijdenes et al. | 369/275.1 X |
| 4,917,970 | 4/1990 | Funkenbusch | 369/13 X |
| 4,940,618 | 7/1990 | Hamada et al. | 369/275.1 X |

OTHER PUBLICATIONS

Patent Abstracts of Japan, Publication No. JP2054450, published Feb. 23, 1990.
Patent Abstracts of Japan, Publication No. JP1064148, published Mar. 10, 1989.
Patent Abstracts of Japan, Publication No. JP1251453, published Oct. 6, 1989.
Patent Abstracts of Japan, Publication No. JP63193342, published Aug. 10, 1988.
Patent Abstracts of Japan, Publication No. JP63237239, published Oct. 3, 1988.
"Substrates for Sputtered Rigid Discs by Chemical Texturing Process" IEICE Tech Rpt. vol. 88, No. 344, Dec. 20, 1988.
Miyamoto, H. et al., "High Speed Magnetic Film Modulation Magneto-Optical Disk Drive", *Hitachi Central Research Laboratory*, MR89-56, pp. 79-85.
Narumi, T. et al., "Study of Protective Layer for Magnetic Field Modulation Recording Media in Magneto Optical Disks", *Fujitsu Laboratories*, Atsugi, 23pc-5, (1989), p. 204.
Yeh, T. et al., "Sliding Damage and Stress State of Multilayer Thin Film Rigid Media", *Journal of the Magnetics Society of Japan*, vol. 13, Supp. No. S1 (1989) pp. 163-168.
Kondo, H. et al., "Novel Lubricants for Magnetic Thin Film Media" *Journal of the Magnetics Society of Japan*, vol. 13, Supp. No. S1 (1989) pp. 213-218.

*Primary Examiner*—John H. Wolff
*Assistant Examiner*—Joseph A. Rhoa
*Attorney, Agent, or Firm*—David G. Conlin; Robert F. O'Connell

[57] ABSTRACT

A magneto-optical disk according to the present invention has a substrate (12), a recording layer (13) formed on the substrate and an outer layer (14) formed on the recording layer, above which a floating head is hovered. The outer layer is constituted of a protective layer, an antisticking layer for head, having a texture formed on its surface and other layers. The magneto-optical disk is designed such that, when rotated at a constant angular velocity, the thickness of the outer layer (14) is substantially inversely proportional to a radial position r on the magneto-optical disk raised to the $\frac{1}{2}$nd power. In the formation of the outer layer, a screen whose meshes become gradually finer from the innermost portion toward the circumferential portion of the magneto-optical disk is employed based on the screen printing technique. Further, photo hardening resin is used as the outer layer, and simply by changing a wavelength or irradiation amount of light to be applied thereto, a texture is readily formed on the surface of the outer layer. By the use of the present invention, stable recording, erasing and re-writing operations are achieved, and it becomes possible to prevent the floating head from sticking to the magneto-optical disk and reduce the cost thereof.

11 Claims, 7 Drawing Sheets

FIG. 13

MAGNETO-OPTICAL DISK HAVING A LAYER OF VARYING THICKNESS

FIELD OF THE INVENTION

The present invention relates to a magneto-optical disk and manufacturing methods thereof, for use in magneto-optical recording/reproducing apparatuses provided with a floating head.

BACKGROUND OF THE INVENTION

In a conventional magneto-optical recording method, recording and reproducing operations on and from a recording medium are performed as described hereinbelow. Here, the recording medium includes a substrate made of glass, plastic, ceramic or other material and a vertically magnetized film formed thereon, which is made of metal magnetic material. In the recording operation, first of all, a magnetization direction of the vertically magnetized film of the recording medium is uniformly arranged to a predetermined direction (upward direction or downward direction) by applying thereon an external magnetic field or the like. (This process is hereinbelow referred to as initialization.) Then a laser beam is projected on a portion of the recording medium where the recording is performed so that a temperature of the portion is raised to a point above the vicinity of the Curie temperature or to a point above the vicinity of the magnetic compensation temperature. As a result, a magnetic coercive force (Hc) at the portion becomes zero or substantially zero. In this state, an external magnetic field (bias magnetic field) having a reverse magnetization direction to the initialized magnetization direction is applied, thereby causing the magnetization direction of the recording medium to be reversed. When the application of the laser beam is stopped, the temperature of the portion illuminated by the laser beam returns to a room temperature and the reversed magnetization direction is thus fixed, thereby permitting information to be recorded. This type of recording is referred to as thermomagnetic recording.

In the reproducing operation, a linearly polarized laser beam is projected onto the recording medium. A polarization plane of a resulting reflected light or transmitted light from or through the recording medium rotates in a different direction according to the magnetization direction of the recording medium (upward direction or downward direction), which is a phenomenon referred to as the magnetic Kerr effect or the magnetic Faraday effect. Information on the recording medium is optically read out by utilizing this phenomenon.

Recording media used in the magneto-optical recording system (magneto-optical disks) have been noted as large capacity memory elements of a rewritable type. Presently, there are two methods for re-writing over the information recorded on the recording medium, as described in (i) and (ii) hereinbelow.

(i) A method wherein, after an erasure of the previously recorded information is performed by initializing the recording medium once again, new information is written thereon.

(ii) A method wherein a recording medium or an external magnetic field generating device is improved so that overwriting can be performed, i.e. the information is re-written directly without performing the erasure.

If method (i) is adopted, either an additional initialization device besides a recording head or two heads for recording and erasing must be installed, thereby causing an increase in the number of parts as well as a rise in cost. Moreover, in case of recording and erasing information with a single head, the same time as required for recording is required for erasing as a waiting time, resulting in the inefficient operation of re-writing information.

In the mean time, if method (ii) is adopted so as to improve the recording medium, it is difficult to control recording medium composition, film thickness and so on. Consequently, the most effective method is to improve the external magnetic field generating device of method (ii), i.e. a magnetic field modulation method for switching a direction of the external magnetic field at high speeds according to information to be recorded, while keeping the intensity of the laser beam constant.

Figure 10:
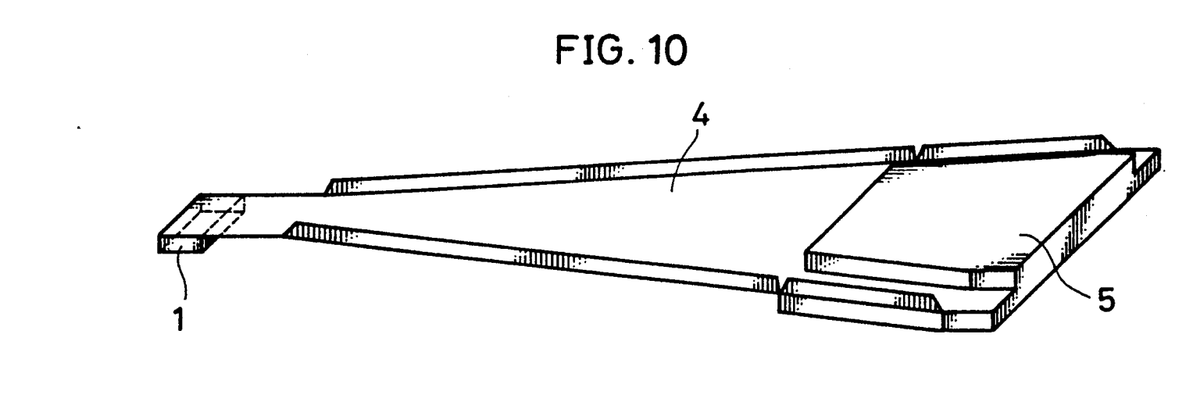
FIG. 10 is a perspective view showing a floating head.
Figure 11:
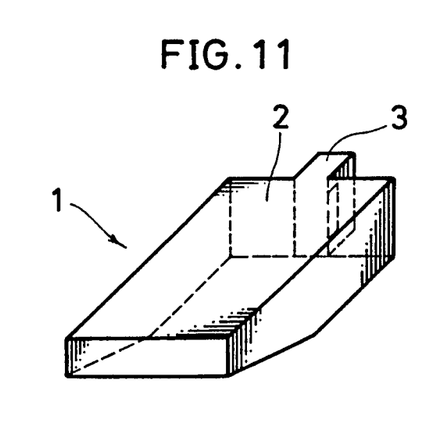
FIG. 11 is an enlarged partial view of FIG. 10.

In order to switch the direction of the external magnetic field at high speeds, a magnetic head (i.e. a coil and a coil core) of the external magnetic field generating device must be miniaturized to a great degree. In this case, however, a generating area of the magnetic field becomes smaller. In order to counteract this, a magnetic head and a recording medium must be brought closer to each other. As shown in FIG. 10 and FIG. 11, generally a floating head 1 of a sliding type which can glide over a recording medium in the shape of a disc (not shown) is employed as the external magnetic field generating device. The floating head 1 is provided with a slider section 2 and a magnetic head section 3 installed in the slider section 2. Further, a suspension 4 composed of plate springs and other members, having its one end fixed to a base 5, supports the floating head 1 secured to the other free end thereof so that it is pressed down toward the recording medium. According to the configuration, when the recording medium is rotated, the floating head 1 floats over the recording medium with a small amount of gap from its surface.

A constant floating height of the floating head 1 is maintained due to the fact that an upward floating force caused by the air flowing between the slider section 2 and the recording medium balances with a downward depressing force by the suspension 4. The floating head of this type is also used in conventional hard disk devices. In the case of the hard disks, the floating height is of a submicron order. When a magneto-optical disk is used as the recording medium, a floating height of 5 $\mu$m to 15 $\mu$m is necessary, i.e, a larger floating height is required for the magneto-optical disk than for the hard disk. The reasons for this are as follows. Since the magneto-optical disks are transportable, dust tends to stick more frequently on the disk. As a result, a too small floating height might cause troubles such as a head crash where the magnetic head section 3 is damaged by dust.

In the case of a magneto-optical disk which requires such a large floating height of 5 $\mu$m to 15 $\mu$m, variations in the floating height depend greatly on the relative speed between the floating head 1 and the recording medium. For example, when the recording medium is rotated based on the constant angular velocity control system, the relative speed increases as the floating head 1 moves toward the circumferential portion of the recording medium, and consequently the floating height also increases.

As described above, the relative speed between the floating head 1 and the recording medium varies depending on a radial position of the recording medium, and this causes the floating height of the floating head 1 with respect to the recording medium to vary. In this case, the magnitude of a magnetic field to be applied to the recording medium varies depending on a radial position of the recording medium. This causes a problem that recording and erasing operations cannot be performed under constant conditions.

Figure 12A:
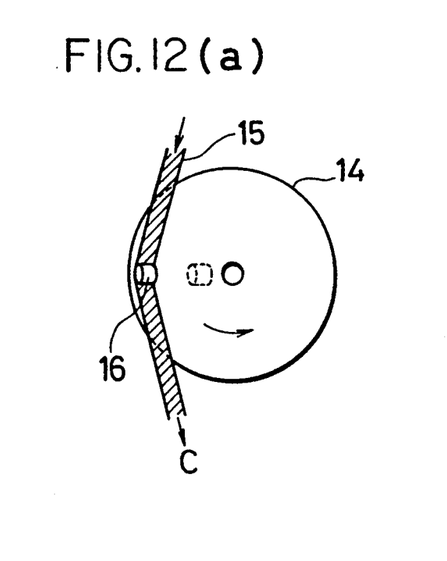
FIG. 12(a) and FIG. 12(b) are plan views showing processes to form a texture on a surface of a magneto-optical disk.
Figure 12B:
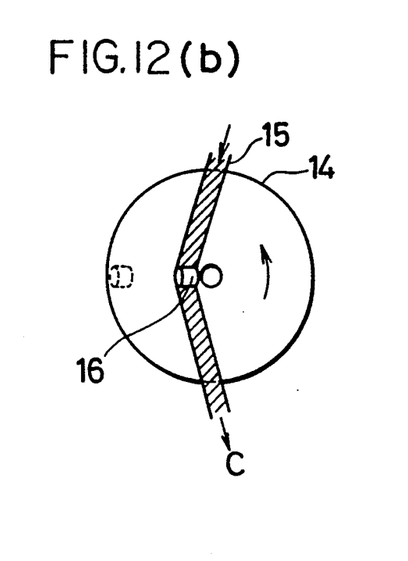
Figure 13:
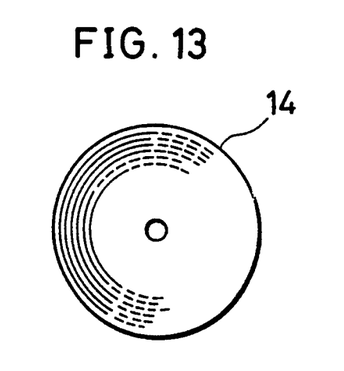
FIG. 13 is a plan view showing the magneto-optical disk whereon the texture is formed through the processes of FIG. 12.

A surface of the magneto-optical disk facing the bottom surface of the floating head 1 is textured with fine and physical protrusions and recessions (hereinafter, referred to as texture), thereby preventing these surfaces from sticking to each other. As shown in FIG. 12(a) and FIG. 12(b), when forming the texture on the surface of the magneto-optical disk, a texture tape 15 having fine protrusions and recessions on the surface thereof is depressed onto a rotating magneto-optical disk 14 by a tape pressure roll 16. Then, the texture tape 15 is on the one hand fed in a direction indicated by an arrow C, and on the other hand moved from the circumferential portion to the inner portion of the magneto-optical disk 14 while being depressed thereon by the tape pressure roll 16. In this case, a rotation direction of the magneto-optical disk 14 is substantially parallel to a feeding direction of the texture tape 15. Therefore, as shown by concentric lines in FIG. 13, substantially following the rotation direction of the magneto-optical disk 14, a texture is uniformly formed on the surface of the magneto-optical disk 14 facing the floating head 1.

However, in the texture forming method as described above, it is necessary to provide a process for depressing the texture tape 15 on each one of the magneto-optical disks 14. For this reason, the method described above results in high manufacturing costs of the magneto-optical disks 14, thereby failing to provide a suitable method for quantity production. Further, another problem is presented in that when forming the texture, the quality is lowered due to unnecessary stress imposed on the magneto-optical disk 14 or dust produced during the process that adheres to the magneto-optical disk 14.

SUMMARY OF THE INVENTION

It is an object of the present invention to provide a magneto-optical disk and its manufacturing method, wherein a distance from a recording layer contained in the magneto-optical disk rotating in the constant angular velocity system to a floating head floating over the magneto-optical disk is kept substantially constant regardless of an instantaneous radial position on the magneto-optical disk.

It is another object of the present invention to provide a magneto-optical disk together with its manufacturing method whose surface facing the floating head is subject to texture-wise processing and which permits production in quantity.

In order to achieve the above objects, a magneto-optical disk of the present invention comprises a substrate, a recording layer formed on the substrate and an outer layer formed on the recording layer, over which the floating head is hovered. The outer layer is composed of a protective layer for the recording layer, an antisticking layer for the floating head, having a texture formed on the surface thereof, and other layers. When a recording, erasing or re-writing operation is performed on or from the magneto-optical disk while rotating it at a constant angular velocity, the thickness of the outer layer is set to be substantially inversely proportional to a radial position r raised to the $\frac{1}{2}$nd power.

The screen printing technique is applied to the manufacture of the above magneto-optical disks. More concretely, on a substrate having a recording layer formed thereon, a resin is applied as a protective layer or an antisticking layer for the head through a screen whose grids become finer from the innermost portion to the circumferential portion of the magneto-optical disk, and then the resin is hardened. Alternatively, after mounting a protective layer in a constant thickness on the recording layer formed on the substrate, the antisticking layer for the head may be formed through the screen as the outermost layer.

In the above arrangement, the floating height h of the floating head varies in proportion to the square root of a relative speed between the floating head and the magneto-optical disk, that is, the relative speed raised to the $\frac{1}{2}$nd power. Therefore, when the magneto-optical disk is rotated at a constant angular velocity, the floating height h is substantially directly proportional to the radial position r raised to the $\frac{1}{2}$nd power. Taking notice of this point, by setting a thickness t of the outer layer to be substantially inversely proportional to the radial position r raised to the $\frac{1}{2}$nd power as described above, a distance (h+t) between the floating head and the recording layer is maintained substantially constant regardless of changes of the radial position r. As a result, the magnitude of a magnetic field to be applied to the recording layer during recording, erasing or re-writing is kept substantially constant regardless of the radial position r.

In order to manufacture magneto-optical disks whose outer layer becomes thinner in its thickness toward the circumferential portion, the thickness of the outer layer can be varied by applying a resin for the protective layer or the antisticking layer for the head through a screen whose grids become gradually finer toward the circumferential portion.

Further, in order to achieve another object, another magneto-optical disk of the present invention is characterized in comprising an outermost layer composed of a photo hardening resin, having fine physical protrusions and recessions formed on the surface as a texture.

In order to manufacture the above magneto-optical disks, firstly the surface of the substrate having the recording layer formed thereon is coated with a photo hardening resin, and a first light is projected on the photo hardening resin, thereby permitting the surface of the photo hardening resin to be hardened. Next, a second light whose wavelength is shorter than that of the first light is projected on the photo hardening resin, thereby permitting the entire portion including the internal portion to be hardened. Additionally, by projecting more light in its irradiation amount on the inner portions of the magneto-optical disk than on the outer portions thereof, the inner portions may have a rougher texture formed thereon than the outer portions.

With the above arrangement, it is possible to readily form fine physical protrusions and recessions on the surface of the magneto-optical disk, by merely projecting on the photo hardening resin two light rays having different wave-lengths to each other through different stages, or by merely changing the irradiation amount of light to be projected between the inner portions and the outer portions. Additionally, in forming the physical protrusions and recessions, it is possible to create a difference between shrinkages of the resin caused by the surface hardening and caused by the internal hardening. Thus, it is possible to manufacture in quantity magneto-optical disks that are free from sticking to the floating head.

For a fuller understanding of the nature and advantages of the invention, reference should be made to the ensuing detailed description taken in conjunction with the accompanying drawings.

BRIEF DESCRIPTION OF THE DRAWINGS

FIGS. 1 to 2 show one embodiment of the present invention.

FIG. 3 and FIG. 4 show the second embodiment of the present invention.

FIG. 6 and FIG. 7 show the third embodiment of the present invention.

FIG. 8 and FIG. 9 show the fourth embodiment of the present invention.

FIGS. 10 to 13 show the prior art.

DESCRIPTION OF THE EMBODIMENTS

Figure 1:
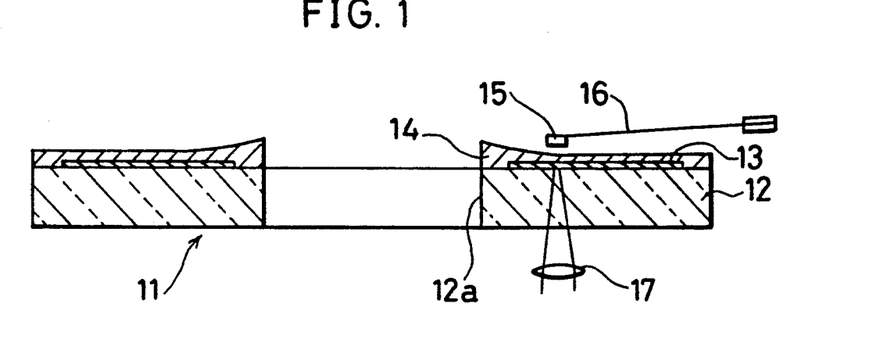
FIG. 1 is a schematic longitudinal sectional view of a magneto-optical disk.
Figure 2A:
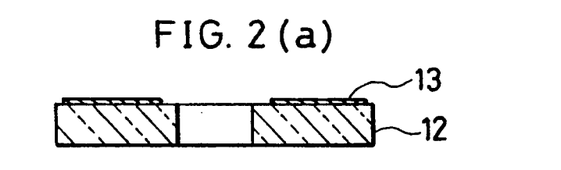
FIG. 2(a) to FIG. 2(c) are schematic longitudinal sectional views showing manufacturing procedures of the magneto-optical disk.
Figure 2B:
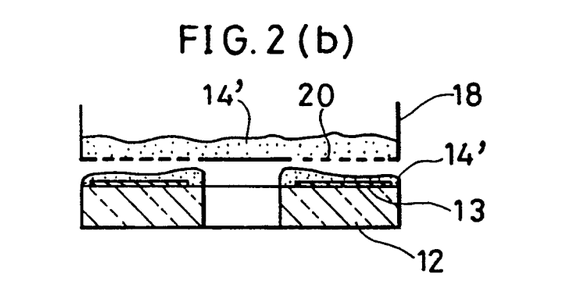
Figure 2C:
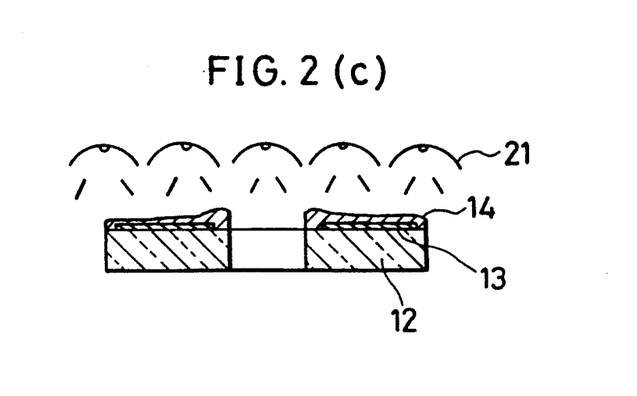
Figure 5:
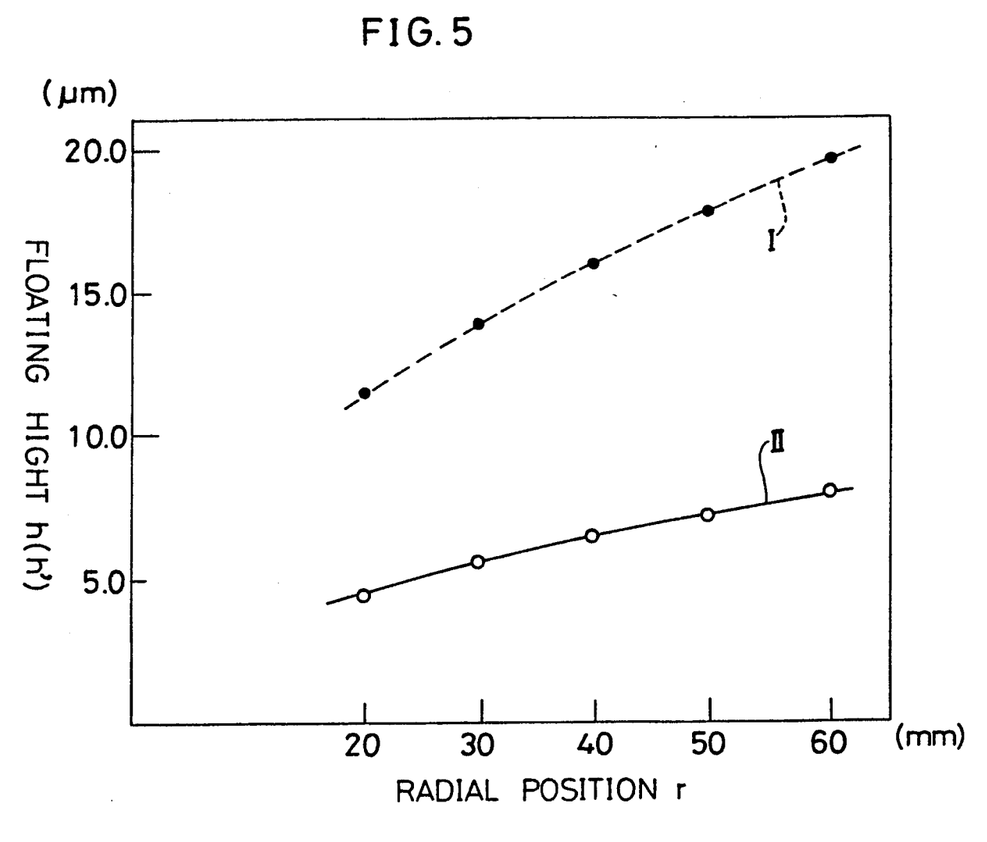
FIG. 5 shows graphs, each indicating a relationship of a radial position r and a floating height h of a floating head, in the magneto-optical disk disclosed in the first embodiment or the second embodiment.

Referring to FIGS. 1, 2 and 5, the following description will discuss the first embodiment of the present invention.

As shown in FIG. 1, a magneto-optical disk 11 is provided with a substrate 12 having a hole 12a formed in the center thereof. The substrate 12 is made of glass or an optically transparent resin such as polycarbonate, polymethyl methacrylate and amorphous polyolefine. Further, although not shown in the drawings in a concrete manner, there are installed on the substrate 12, if necessary, guiding grooves for guiding a light beam during recording, reproducing, erasing or re-writing and pits indicating addresses of recording/reproducing positions.

A recording layer 13 is formed on the substrate 12 in the shape of a single layer of magnetic film or a multi-layer film including a dielectric film, a magnetic film and a reflection film so as to emphasize the magnetic Kerr effect in reproduction. Each of the above films is formed on the substrate 12 by, for example, sputtering or evaporation. As the above magnetic film, for example, a polycrystal thin film made of MnBi or PtMnSb, an amorphous thin film made of a rare earth transition metal such as CdTbFe, TbFeCo or DyFeCo, or an artificial grating film such as a (Pt/Co) multilayer film is employed.

Further, the recording layer 13 is coated with a protective layer 14 made of, for example, an UV hardening resin for screen printing having a high viscosity of not less than 1,000[cps].

Moreover, a recording/reproducing apparatus for recording, reproducing, erasing or re-writing on or from the magneto-optical disk 11 is provided with a floating head 15 and an optical head (not shown) including an object lens 17. The floating head 15 includes a slider section capable of gliding over the protective layer 14 and a magnetic head integrally installed in the slider section, and is subject to a force toward the protective layer 14 of the magneto-optical disk 11 by a suspension 16. The optical head projects a laser beam on the recording layer 13 through the substrate 12. Here, although the slider section and the magnetic head are not shown concretely in the drawings, they may have, for example, the same structures as those shown in FIG. 11.

The thickness of the protective layer 14 is designed so as to become thinner toward the circumferential portion of the magneto-optical disk 11. More concretely, suppose that the size of the slider section of the floating head is 10[mm]×10[mm], and the magneto-optical disk 11 is rotated at the constant angular velocity of 3,600[rpm]. A relationship between the radial position r [mm] on the magneto-optical disk 11 and the thickness $t_1$ [μm] of the protective layer 14 is represented by:

$$t_1 = a_1/r(^1) - b_1 \quad (1).$$

In the equation (1), $a_1$ and $b_1$ are constants, and preferably determined to be, for example, $a_1 = 80$ and $b_1 = 10$.

FIG. 5 shows a curve I which gives measurements of the floating height h of the floating head 15 at each radial position r on the magneto-optical disk 11. Here, the curve I is obtained under conditions that the floating head 15 including the slider section having the size of 10[mm]×10[mm] is depressed toward the protective layer 14 at a depressing force of 5[gf] by the suspension 16, while the magneto-optical disk 11 is rotated at 3,600[rpm]. As is obvious by the curve I, as the floating head 15 is shifted toward the circumferential portion of the magneto-optical disk 11, that is, as the relative speed between the floating head 15 and the magneto-optical disk 11 increases, the floating height increases.

When the protective layer 14 is designed to become gradually thinner toward the circumferential portion of the magneto-optical disk 11 based on the equation (1), a distance between the floating head 15 hovering over the protective layer 14 and the recording layer 13 can be maintained substantially constant regardless of an instantaneous radial position of the magneto-optical disk 11.

The following Table 1 indicates the floating height h at each radial position r (which is represented by the curve I of FIG. 5); the thickness $t_1$ of the protective layer 14 at the radial position r, calculated by the equation (1); and the sum (h+t₁) of the floating height h and the thickness t₁, that is, the distance between the floating head 15 hovering above the radial position r and the recording layer 13. As can be seen by Table 1, variations of (h+t₁) with the radial position r are extremely smaller than those of the floating height h with the radial position r, and the value (h+t₁) with respect to the radial position r is maintained substantially constant.

TABLE 1

| Position r [mm] | 20 | 30 | 40 | 50 | 60 |
|---|---|---|---|---|---|
| Floating Height h [μm] | 11.4 | 13.8 | 15.8 | 17.6 | 19.2 |
| Film Thickness t₁ [μm] | 7.9 | 4.6 | 2.6 | 1.3 | 0.3 |
| h + t₁ [μm] | 19.3 | 18.4 | 18.4 | 18.9 | 19.5 |

Next, the following description will discuss a manufacturing method of the magneto-optical disk 11.

As shown in FIG. 2(a), first, the recording layer 13 is formed on the substrate 12. Next, as shown in FIG. 2(b), in order to form the protective layer 14, ultraviolet hardening resin 14' is placed on the recording layer 13 through a screen printing technique. (Ultraviolet is hereinafter referred to simply as UV.) A form 18 for the screen printing has a half-tone screen 20 in the bottom section thereof. Meshes of the screen 20 are rough at the innermost portion of the magneto-optical disk 11, and designed to become gradually finer from the innermost portion toward the circumferential portion of the magneto-optical disk 11. Thus, the UV hardening resin 14' is placed on the recording layer 13 in such a manner that it is thick at the innermost portion of the magneto-optical disk 11 and becomes gradually thinner from the innermost portion toward the circumferential portion of the magneto-optical disk 11, that is, more concretely the thickness t₁ of the UV hardening resin 14' and the radial position r satisfy the relationship of the equation (1).

Next, as shown in FIG. 2(c), the UV hardening resin 14' is irradiated with an UV ray projected from an UV lamp 21, thereby being hardened to form the protective layer 14. Additionally, at this time, if you want to form on the surface of the protective layer 14 a texture of physical protrusions and recessions in order to prevent the protective layer 14 from sticking to the floating head 15, you can form the protective layer 14 through two stages of hardening wherein, after having hardened the surface of the UV hardening resin 14', the internal portion thereof is hardened.

The following description will discuss the second embodiment of the present invention.

Figures 3, 4A:
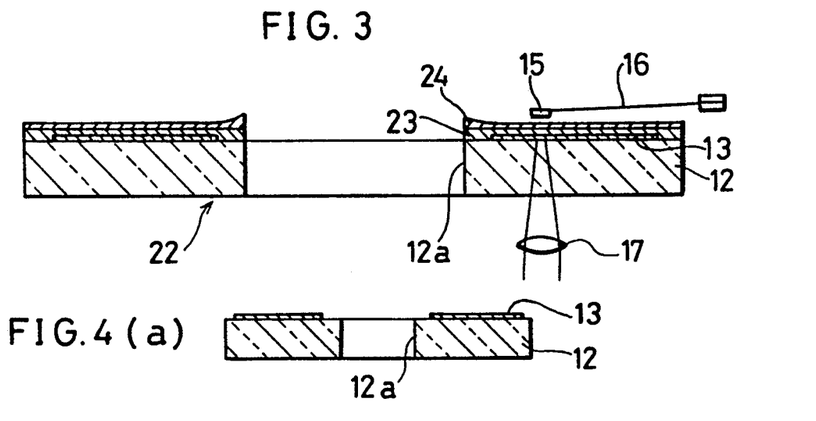
FIG. 3 is a schematic longitudinal sectional view of a magneto-optical disk.
FIG. 4(a) to FIG. 4(e) are schematic longitudinal sectional views showing manufacturing procedures of the magneto-optical disk.

As shown in FIG. 3, a magneto-optical disk 22 of the present invention is constituted of a substrate 12 whereon a recording layer 13, protective layer 23 and antisticking layer 24 for head 15 are successively deposited. The protective layer 23 is formed with a constant thickness t₀ by the use of, for example, an UV hardening resin such as urethane acrylate. On the other hand, the antisticking layer for head 24 is formed of an UV hardening resin for the screen printing having a high viscosity of substantially not less than 1,000[cps] so as to have a thickness t₂ which is gradually decreasing from the innermost portion to the circumferential portion of the magneto-optical disk 22.

More concretely, suppose that the size of the slider section of the floating head 15 is, for example, 5[mm]×5[mm], and the magneto-optical disk 22 is rotated at a constant angular velocity of 3,600[rpm]. A relationship among the radial position r [mm] on the magneto-optical disk 22, the thickness t₀ of the protective layer 23 and the thickness t₂ of the antisticking layer 24 for head 15 is represented by:

$$t_2 = (a_2/r^4) - b_2) - t_0 \quad (2)$$

In the equation (2), a₂ and b₂ are constants, and preferably determined to be, for example, a₂=50 and b₂=0.

FIG. 5 shows a curve II which gives measurements of the floating height h' of the floating head 15 at each radial position r on the magneto-optical disk 22. Here, the curve II is obtained under conditions that the floating head 15 including the slider section having the size of 5[mm]×5[mm] is depressed toward the magneto-optical disk 22 at a depressing force of 5[gf] by the suspension 16, while the magneto-optical disk 22 is rotated at 3,600[rpm]. Further, the following Table 2 indicates the floating height h' of the floating head 15 at each radial position r, the thickness t₀ of the protective layer 23, the thickness t₂ of the antisticking layer for head 24 and the sum (h+t₀+t₂), that is, the distance between the recording layer 13 and the floating head 15 hovering above the antisticking layer for head 24.

As is obvious by Table 2, although the floating height h' varies greatly with the radial position r, the value, (h'+t₀+t₂), is substantially constant regardless of the radial position r. Therefore, the distance between the floating head 15 and the recording layer 13 is kept substantially unchanged, and recording or erasing is performed under the same conditions regardless of the radial position on the magneto-optical disk 22.

TABLE 2

| Position r [mm] | 20 | 30 | 40 | 50 | 60 |
|---|---|---|---|---|---|
| Floating Height h' [μm] | 4.3 | 5.6 | 6.2 | 7.0 | 7.8 |
| Film Thickness t₀ [μm] | 5.0 | 5.0 | 5.0 | 5.2 | 5.4 |
| Film Thickness t₂ [μm] | 6.2 | 4.1 | 2.9 | 2.0 | 1.1 |
| h' + t₀ + t₂ [μm] | 15.5 | 14.7 | 14.1 | 14.2 | 14.3 |

Next, the following description will discuss one example of manufacturing methods of the magneto-optical disk 22 in accordance with the present embodiment.

Figure 4B:
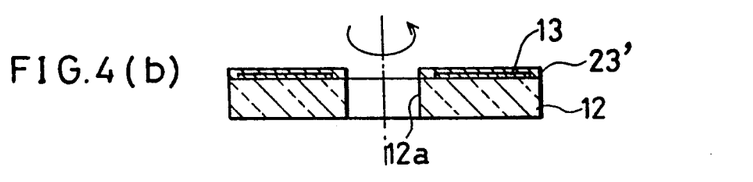
Figure 4C:
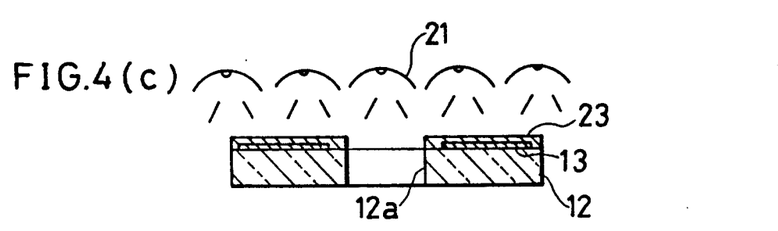

As shown in FIG. 4(a), a recording layer 13 is formed on a substrate 12. Then, as shown in FIG. 4(b), UV hardening resin 23', after having been applied on the recording layer 13 by dripping, is uniformly spread thereon with the rotation of the substrate 12. Successively, as shown in FIG. 4(c), an UV ray is projected by an UV lamp 21. As a result, the UV hardening resin 23' is hardened to form a protective layer 23.

Figure 4D:
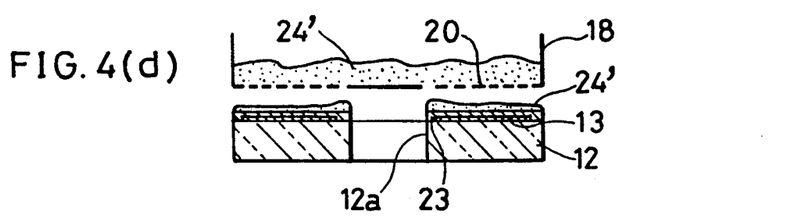
Figure 4E:
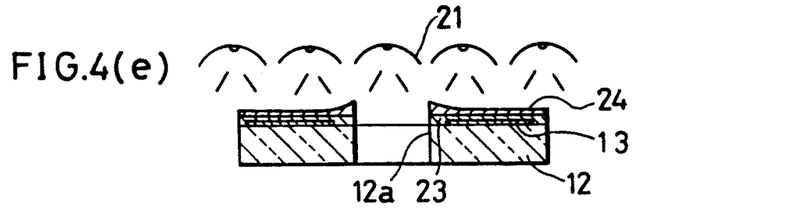

Next, as shown in FIG. 4(d), as with the case of the first embodiment, in order to form an antisticking layer for head 24, UV hardening resin 24' is placed through a screen 20 whose meshes become finer from the innermost portion to the circumferential portion of the magneto-optical disk 22. Then, as shown in FIG. 4(e), an UV ray is projected thereon by the UV lamp 21, thereby forming the antisticking layer 24 for head 15.

Additionally, in the above embodiment, while keeping the thickness t₀ of the protective layer 23 at a constant value, the thickness t₂ of the antisticking layer 24 for head 15 is varied according to the radial position r; yet, conversely, while keeping the thickness t₂ of the antisticking layer 24 for head 15 at a constant value, the thickness t₀ of the protective layer 23 may be varied according to the radial position r. In short, the sum of the thickness (t₀+t₂) of the protective layer 23 and the antisticking layer 24 for head 15 must be varied according to the radial position r based on the equation (2), and it must gradually decrease toward the circumferential portion of the magneto-optical disk 22.

Moreover, in the first and second embodiments, the magneto-optical disk 11 or 22 is rotated in the constant angular velocity control system, and the thickness $t_1$ of the protective layer 14 or the thickness $t_2$ of the antisticking layer 24 for head 15 is varied so as to be substantially inversely proportional to the radial position r raised to the $\frac{1}{2}$nd power. The development of this condition results in the fact that the thickness $t_1$ of the protective layer 14 or the thickness $t_2$ of the antisticking layer 24 for head 15 may be varied so as to be substantially inversely proportional to a relative speed between the floating head 15 and the magneto-optical disk 11 or 22 raised to the $\frac{1}{2}$nd power.

Furthermore, although the protective layer 14 of the first embodiment and the antisticking layer 24 for head 15 of the second embodiment are made of UV hardening resin for screen printing, other types of resin may be employed.

Figure 6:
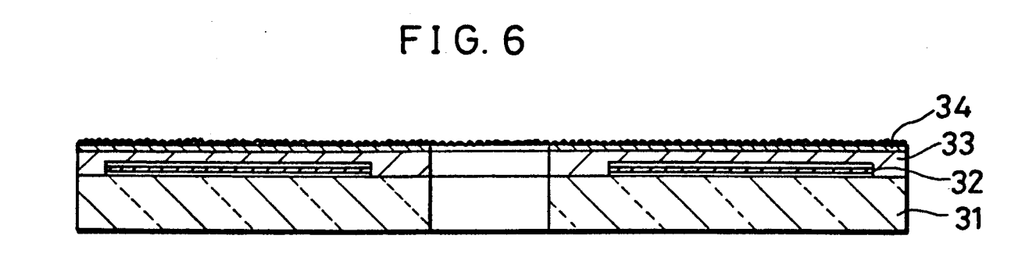
FIG. 6 is a schematic longitudinal sectional view of a magneto-optical disk.
Figure 7A:
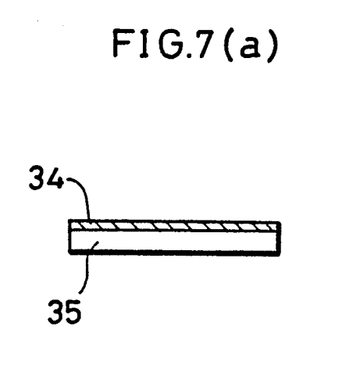
FIG. 7(a) to FIG. 7(c) are schematic longitudinal sectional views showing manufacturing procedures of the magneto-optical disk.
Figure 7B:
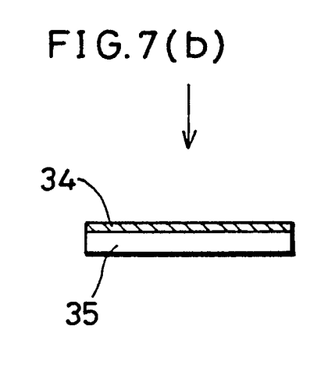
Figure 7C:
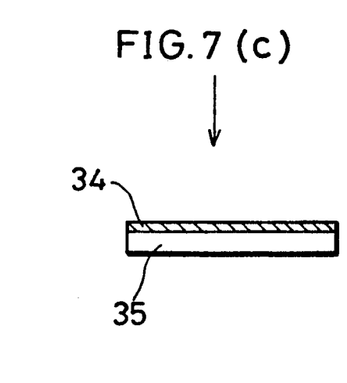

Referring to FIG. 6 and FIG. 7, the third embodiment will discuss a magneto-optical disk whose surface possesses a texture made of fine and physical protrusions and recessions and manufacturing methods thereof.

FIG. 6 shows a cross sectional view of the magneto-optical disk having the texture of the present invention. A transparent substrate 31 is made of glass or an optically transparent resin such as polycarbonate, polymethyl methacrylate and amorphous polyolefine. A recording film 32 of a single layer or multilayer constituted of a dielectric film, recording film, reflection film and the like is formed on the transparent substrate 31 by sputtering or evaporation. Further, the transparent substrate 31 as well as the recording film 32 is coated with a protective layer 33 made of UV hardening resin. A texture formation use UV hardening resin 34 to form a surface layer is made of a material different from that of the protective layer 33.

Additionally, the protective layer 33 is not necessarily provided thereon, and the UV hardening resin 34 may include the function of the protective layer 33. The resin of the acrylate family such as, for example, urethane acrylate, epoxy acrylate or polyol acrylate is used as the UV hardening resin 34.

Referring to FIG. 7, the following description will discuss manufacturing methods of the above magneto-optical disk.

The transparent substrate 31 having the recording film 32 and, if necessary, the protective layer 33 formed thereon is shown as a main substrate 35. FIG. 7(a) illustrates a coating process of the UV hardening resin 34. As a concrete example of the UV hardening resin 34 to be applied on the main substrate 35, ink for screen printing (for example, trade name RAYVEX SC62F of Dainippon Ink Chemical Industry Corp.) is employed.

FIG. 7(b) and FIG. 7(c) illustrate two stages of UV irradiation/hardening process. In other words, in order to form a texture, surface hardening and internal hardening of the UV hardening resin 34 are individually performed. (For the UV irradiation, a UCC photo-cure system of Union Carbide Co., Ltd. can be employed.)

As shown in FIG. 7(b), an UV light L1 which is projected in the first stage so as to harden only the surface layer of the UV hardening resin 34, has an intensity distribution that becomes maximum in a comparatively longer wave-length of, for example, 300 to 400 nm. On the other hand, as shown in FIG. 7(c), an UV light L2 which is projected in the second stage so as to harden the entire UV hardening resin 34 including the internal portion thereof, has an intensity distribution that becomes maximum in a shorter wave-length than that of the UV light L1, that is, in a wave-length within, for example, 200 to 300 nm. As a result, due to a difference of a shrinkage caused by the hardening of the surface layer in the first stage and that caused by the hardening of the internal portion in the second stage, physical protrusions and recessions are formed on the surface layer, that is, a texture is formed thereon.

Additionally, during projecting the UV light L1, an application of $N_2$ gas, for example, as a flow of substantial 10.0 m$^3$/h can speed up the hardening only on the surface layer.

Figure 8:
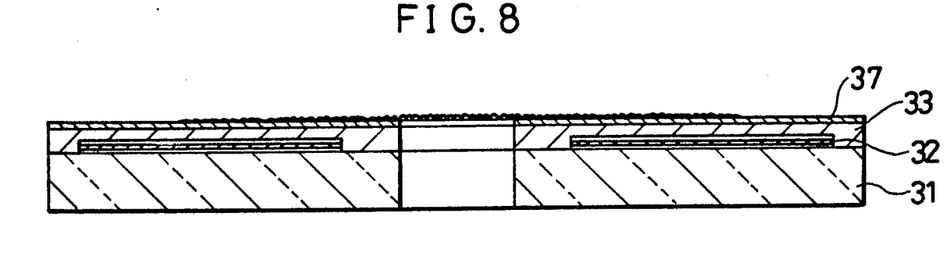
FIG. 8 is a schematic longitudinal sectional view of a magneto-optical disk.
Figure 9A:
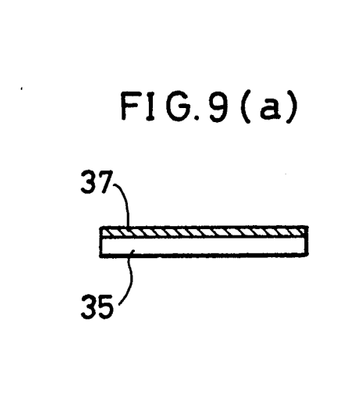
FIG. 9(a) to FIG. 9(c) are schematic longitudinal sectional views showing manufacturing procedures of the magneto-optical disk.
Figure 9B:
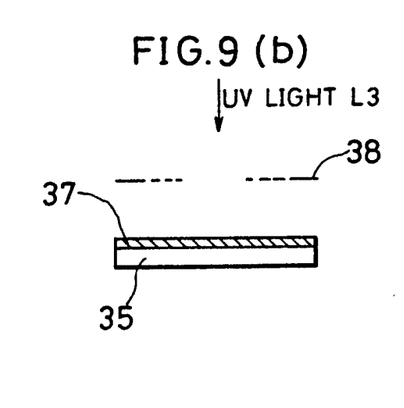
Figure 9C:
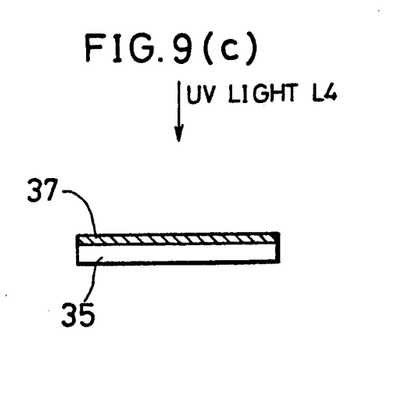

Referring to FIG. 8 and FIG. 9, the following description will discuss the fourth embodiment of the present invention.

FIG. 8 shows a texture formed on a texture formation use UV hardening resin 37, which is different from that of the third embodiment. In this structure, comparatively rougher physical protrusions and recessions are formed on inner portions of the UV hardening resin 37, while comparatively finer physical protrusions and recessions than those of the inner portions are formed on outer portions of the UV hardening resin 37. The structure other than that shown in the above is the same as the third embodiment.

Similarly, in the above method of forming the texture, surface hardening and internal hardening of the UV hardening resin 34 are individually performed through two stages. First, as shown in FIG. 9(a), UV hardening resin 37 is applied on the surface of the main substrate 35 at the side on which the protective layer, not shown, is formed. Then, as shown in FIG. 9(b), after placing a mask 38 above the UV hardening resin 37, an UV light L3 is projected thereon. The mask 38 is designed such that it transmits the UV light L3 to be applied to the innermost portion of the UV hardening resin 37; gradually reduces the amount of transmitted UV light L3 to be applied from the inner portions to the outer portions of the UV hardening resin 37; and substantially shades the UV light L3 from the circumferential portion of the UV hardening resin 37. Thereafter, as shown in FIG. 9(c), after removing the mask 38, the UV light L3 is projected on the UV hardening resin 37 again.

With the above method, the innermost portion of the UV hardening resin 37 is hardened through the two stages such that fine physical protrusions and recessions are formed thereon as a texture, while the circumferential portion is hardened through the one stage such that almost no fine physical protrusions and recessions are formed on the surface thereof. As a result, the magneto-optical disk of the present invention has rough physical protrusions and recessions whose maximum height per unit area ranges within 100 to 2,500 μm formed on the innermost portion thereof and fine physical protrusions and recessions whose maximum height per unit area ranges less than 200 μm formed on the circumferential portion thereof.

As described above, the magneto-optical disk of the present invention is designed such that, when it is rotated at a constant angular velocity, the thickness of the outer layer with which the recording layer is covered is substantially inversely proportional to a radial position raised to the $\frac{1}{2}$ power. This arrangement is based on the fact that in the case of the constant angular velocity control system, the floating height of the floating head is substantially proportional to a radial position raised to the ⅓ power. Thus, the distance between the floating head and the recording layer is maintained substantially constant regardless of the radial position. As a result, since the magnitude of a magnetic field to be applied to the recording layer during recording, erasing, or rewriting is kept substantially constant regardless of the radial position, stable recording, erasing and rewriting operations can be performed. In addition, the thickness of the outer layer can be readily changed by adopting the screen printing technique.

Furthermore, when light hardening resin is employed as the outer layer, physical protrusions and recessions can be readily formed on the surface of the outer layer as a texture by changing the wave-length or amount of light to be applied thereto.

Therefore, the magneto-optical disk of the present invention together with its manufacturing method makes it possible to perform stable recording, erasing and rewriting operations, prevent the floating head from sticking thereto and reduce the cost thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical disk comprising:
a substrate;
a recording layer formed on the substrate; and
a protective layer above which hovers a floating head for recording and/or erasing on and/or from the magneto-optical disk rotating at a constant angular velocity,
wherein a relationship thereof is substantially represented by an equation:

$$t_1 = a_1/r^{(\frac{1}{3})} - b_1,$$

where $t_1$ is the thickness of the protective layer; r is a radial position on the magneto-optical disk; $a_1$ is a positive constant; and $b_1$ is a constant which is not negative.

2. A magneto-optical disk comprising:
a substrate;
a recording layer and a protective layer formed on the substrate; and
an antisticking layer, above which hovers a floating head for recording and/or erasing on and/or from the magneto-optical disk rotating at a constant angular velocity,
wherein a relationship thereof is substantially represented by an equation:

$$t_2 = (a_2/r^{(\frac{1}{3})} - b_2) - t_1,$$

where $t_1$ is the thickness of the protective layer; $t_2$ is the thickness of the antisticking layer; r is a radial position on the magneto-optical disk; $a_2$ is a positive constant; and $b_2$ is a constant which is not negative.

3. A magneto-optical disk as set forth in claim 2, wherein the protective layer is made of an UV hardening resin of the acrylate family.

4. A magneto-optical disk as set forth in claim 2, wherein the antisticking layer is made of a screen printing use UV hardening resin having a viscosity of not less than 1,000.

5. A magneto-optical disk as set forth in claim 2, wherein:
the value of the constant $a_2$ is set to 50 and the value of the constant $b_2$ is set to 0, when the size of a slider provided in the floating head is 5 mm. × 5 mm., an elastic means supporting the floating head depresses the floating head toward the antisticking layer at a load of 5 gf. and a rotation speed of the magneto-optical disk is 3,600 rpm.

6. A magneto-optical disk as set forth in claim 2, wherein either the thickness of the protective layer or that of the antisticking layer for head is set to be a given value.

7. A magneto-optical disk as set forth in claim 1, wherein the protective layer is made of a screen printing use UV hardening resin having a viscosity of not less than 1,000.

8. A magneto-optical disk as set forth in claim 1, wherein:
the value of the constant $a_1$ is set to 80 and the value of the constant $b_1$ is set to 10, when the size of a slider provided in the floating head is 10 mm. × 10 mm., an elastic means supporting the floating head depresses the floating head toward the protective layer at a load of 5 gf. and a rotation speed of the magneto-optical disk is 3,600 rpm.

9. A magneto-optical disk as set forth in claim 1, 2, wherein the recording layer is a single layer.

10. A magneto-optical disk as set forth in claim 1, 2, wherein the recording layer has a multi-film structure including a dielectric film, recording film and reflection film.

11. A magneto-optical disk comprising:
a substrate;
a recording layer and a protective layer formed on the substrate; and
an antisticking layer, above which hovers a floating head for recording and/or erasing on and/or from the magneto-optical disk rotating at a constant angular velocity,
wherein a sum of the thickness of the protective layer and that of the antisticking layer varies to be substantially inversely proportional to a relative speed between the floating head and the magneto-optical disk raised to the ⅓nd power.

* * * * *